United States Patent
Ito et al.

(10) Patent No.: US 7,827,007 B2
(45) Date of Patent: Nov. 2, 2010

(54) BATTERY CHARACTERISTIC SIMULATING APPARATUS

(75) Inventors: Akihiko Ito, Musashino (JP);
Masayoshi Honma, Musashino (JP);
Takashi Tsuneoka, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 363 days.

(21) Appl. No.: 11/858,165

(22) Filed: Sep. 20, 2007

(65) Prior Publication Data
US 2008/0294380 A1     Nov. 27, 2008

(30) Foreign Application Priority Data
Sep. 21, 2006   (JP)   ............... 2006-255255

(51) Int. Cl.
*H02J 7/00* (2006.01)
*G06F 17/40* (2006.01)

(52) U.S. Cl. ................. 702/183; 702/63; 702/64; 703/18; 703/4

(58) Field of Classification Search ............. 702/183, 702/63, 64
See application file for complete search history.

(56) References Cited

U.S. PATENT DOCUMENTS

| | | | | |
|---|---|---|---|---|
| 6,016,047 A * | 1/2000 | Notten et al. | ............... | 320/137 |
| 7,415,379 B2 * | 8/2008 | Powell et al. | ............... | 702/122 |
| 2006/0132097 A1 * | 6/2006 | Chiang et al. | ............... | 320/150 |
| 2006/0132098 A1 * | 6/2006 | Lin et al. | ............... | 320/150 |

FOREIGN PATENT DOCUMENTS

JP    2003-059544 A    2/2003

* cited by examiner

*Primary Examiner*—Hal D Wachsman
(74) *Attorney, Agent, or Firm*—Sughrue Mion, PLLC

(57) ABSTRACT

A battery characteristic simulating apparatus is provided for supplying electric power for simulating a battery characteristic of a battery to a battery-driven type electronic appliance. The battery characteristic simulating apparatus includes a voltage/current generating unit; a voltage/current measuring unit; a characteristic data acquiring unit; a storage unit; and a simulation signal producing unit that are provided within the same housing of the battery characteristic simulating apparatus.

8 Claims, 4 Drawing Sheets ved from the battery 10 is measured by the voltage/current
BATTERY CHARACTERISTIC SIMULATING APPARATUS This application claims priority from Japanese Patent Application No. JP 2006-255255, filed in the Japan Patent Office on Sep. 21, 2006, the entire contents of which are herein incorporated by reference.

BACKGROUND OF THE INVENTION

Recently, various battery-driven type electronic appliances such as notebook personal computers and portable appliances have been popularized, while the electronic appliances are driven by batteries, or cells. As the batteries for driving these electronic appliances, there are many opportunities that rechargeable batteries, or rechargeable cells (for example, lithium-ion battery) are employed. Then, while a rechargeable battery is repeatedly charged/discharged, battery characteristics thereof (namely, voltage/current characteristics of battery for outputting voltages/currents to load) are different from each other every time this rechargeable battery is charged.

As a consequence, in the case that battery-driven type electronic appliances are tested and/or measured, as previously described, battery characteristics of rechargeable batteries are different from each other every time these rechargeable batteries are charged. As a result, it is difficult to test or measure the electronic appliances in a consistent manner.

Battery characteristic simulating apparatuses are utilized as power supplies instead of rechargeable batteries of electronic appliances. While the battery characteristic simulating apparatuses measure battery characteristics of the rechargeable batteries under a predetermined condition, the battery characteristic simulating apparatuses simulate the measured battery characteristics in a superior reproducibility, and then, supply electric power to the electronic appliances based upon the simulated battery characteristic.

FIG. 5 is a diagram for showing an arrangement of a conventional battery characteristic simulating apparatus.

In FIG. 5, a battery 10 is a battery whose battery characteristic is required to be simulated, and corresponds to, for instance, a lithium-ion battery. Although an electronic appliance 20 is a battery-driven type electronic appliance, the electronic appliance 20 is drivable not only by a battery, but also electric power supplied from an external source (not shown).

A voltage/current curve tracer (will be simply abbreviated as "curve tracer" hereinafter) 30 is provided with a voltage/current generating unit 31, a voltage/current measuring unit 32, a characteristic data storage unit 33, and a communication interface 34, while the curve tracer 30 measures battery characteristics of the battery 10. The voltage/current generating unit 31 and the voltage/current measuring unit 32 are connected to the battery 10. The characteristic data storage unit 33 is connected to the voltage/current generating unit 31 and the voltage/current measuring unit 32 so as to store thereinto characteristic data. The communication interface 34 is communicated with respect to other electronic appliances based upon a predetermined communication protocol.

A general-purpose computer 40 contains another communication interface 41, a calculation unit 42, and a characteristic data table storage unit 43, and is communicated with respect to the curve tracer 30. The communication interface 41 is communicated with the communication interface 34 of the curve tracer 30. The calculation unit 42 is connected to the communication interface 41. The characteristic data storage unit 43 stores thereinto a characteristic data table, and is connected to the calculating unit 42.

A voltage/current generator 50 contains another communication interface 51. The voltage/current generator 50 is communicated with the general-purpose computer 40, and is also connected to the electronic appliance 20. The communication interface 51 of the voltage/current generator 50 is communicated with the communication interface 41 of the general-purpose computer 40.

A voltage/current measuring device 60 contains another communication interface 61, is communicated with the general-purpose computer 40, and is also connected to the electronic appliance 20. The communication interface 61 is communicated with respect to the communication interface 41 of the general-purpose computer 40.

Operations of such a battery characteristic simulating apparatus will now be described. A first description is made of such an operation until a battery characteristic of the battery 10 is acquired.

The voltage/current generating unit 31 of the curve tracer 30 applies a predetermined generated value (namely, outputs either current or voltage) to the battery 10. For instance, the voltage/current generating unit 31 conducts a predetermined current from the battery 10, and at this time, a voltage outputted from the battery 10 is measured by the voltage/current measuring unit 32. Otherwise, the generating unit 31 causes the battery 10 to output a predetermined voltage, and then, at this time, a current outputted from the battery 10 is measured by the measuring unit 32. Then, both the generating unit 31 and the measuring unit 32 store characteristic data of voltage/current constituted by a pair of the generated value and the measured value into the characteristic data storage unit 33.

Furthermore, while the generated value is slightly varied within a predetermined range, plural pieces of characteristic data are measured within the predetermined range, and then, the measured characteristic data are stored in the characteristic data storage unit 33.

When acquisitions of a necessary number of characteristic data are accomplished, the communication interface 34 of the curve tracer 30 is communicated with the communication interface 41 of the general-purpose computer 40 so as to output characteristic data of the characteristic data storage unit 33 to the calculating unit 42 of the general-purpose computer 40.

Thereafter, the calculating unit 42 collects the characteristic data and converts the format of the collected characteristic data into a predetermined format thereof, and then, stores the collected characteristic data having the predetermined format in the table storage unit 43 as a characteristic data table. As a result, the characteristic data table corresponding to the battery characteristic of the battery 10 under predetermined condition is formed in the storage unit 43.

Next, a description is made of operations for outputting to the electronic appliance 20, such output power which simulates a battery characteristic corresponding to the voltage/current characteristic of the battery 10.

An instruction is issued from the calculating unit 42 of the general-purpose computer 40 via the communication interfaces 41 and 51 to the voltage/current generator 50 so as to output therefrom a predetermined generated (either voltage or current). Then, the voltage/current measuring device 60 measures an output of the electronic appliance 20 under the predetermined generated value (namely, if generated value is voltage, then current is measured, whereas if generated value is current, then voltage is measured), and outputs the measured value (either current or voltage value) via the communication interfaces 61 and 41 to the calculating unit 42.

The calculating unit 42 calculates a value (namely, characteristic data) corresponding to the measured value with reference to the characteristic data table of the characteristic data table storage unit 43. In this case, when the corresponding characteristic data is not present in the characteristic data table, the calculating unit 42 interpolates such characteristic data in the vicinity of the measured value in order to obtain the corresponding value. Then, while the calculated value is employed as a new generated value, the calculating unit 42 causes the generator 50 via the communication interfaces 41 and 51 to output a predetermined generated value. Furthermore, the voltage/current measuring device 60 performs a measuring operation for the electronic appliance 50 under the predetermined generated value, and then, outputs a measured value via the communication interfaces 61 and 41 to the calculating unit 42. Since such an operation is repeatedly carried out, the battery characteristic of the battery 10 is reproduced.

[Patent Publication 1]
JP-A-2003-59544

As previously described, the measured value with respect to the predetermined generated value is acquired, and then the new generated value corresponding to this measured value is calculated. As a result, the battery characteristic can be simulated in higher precision and superior reproducibility.

However, the communication operation is carried out via the communication interfaces 41, 51, and 61 of the respective electronic appliances 40, 50, and 60 every time one generated value is outputted so as to transmit/receive the data. As a consequence, there is such a problem that a lengthy time is required to supply the output in accordance with the battery characteristic to the electronic appliance 20. Also, since such a lengthy time is required, there is another problem that a precise simulation as to the battery characteristic can be hardly carried out.

As a consequence, an object of the present invention is to realize a battery characteristic simulating apparatus for performing an output operation in accordance with a battery characteristic in a high speed.

SUMMARY OF THE INVENTION

According to an aspect of the invention, there is provided a battery characteristic simulating apparatus for supplying electric power which simulates a battery characteristic of a battery to a battery-driven type electronic appliance, the apparatus including:

a voltage/current generating unit for outputting a predetermined generated value to both the battery and the electronic appliance;

a voltage/current measuring unit for measuring either the battery or the electronic appliance when the voltage/current generating unit outputs the predetermined generated value;

a characteristic data acquiring unit for acquiring a battery characteristic of the battery based upon characteristic data made by combining the predetermined generated value outputted from the voltage/current generating unit to the battery with a measured value of the battery measured by the voltage/current measuring unit;

a storage unit for storing the battery characteristic of the characteristic data acquiring unit;

a simulation signal producing unit for calculating a generated value for the electronic appliance based upon the battery characteristic stored in the storage unit and the measured value of the electronic appliance measured by the voltage/current measuring unit, and for outputting the calculated generated value to the voltage/current generating unit; and a housing, wherein the voltage/current generating unit, the voltage/current measuring unit, the characteristic data acquiring unit, the storage unit, and the simulation signal producing unit are provided within the same housing.

According to another aspect of the invention, there is provided a battery characteristic simulating apparatus, wherein the battery is a rechargeable battery.

According to yet another aspect of the invention, there is provided a battery characteristic simulating apparatus, wherein the battery characteristic is a voltage/current characteristic which is outputted by the battery.

According to another aspect of the invention, there is provided a battery characteristic simulating apparatus, wherein the storage unit stores thereinto the battery characteristic with respect to each of a plurality of temperatures.

In accordance with the above-described illustrative aspects of present invention, the below-mentioned advantages can be achieved.

That is, the voltage/current generating unit, the voltage/current measuring unit, the characteristic data acquiring unit, the storage unit, and the simulation signal producing unit are employed in the same housing of the battery characteristic simulating apparatus, and then, the simulating operation of the battery is carried out. As a result, the simulating operation speed is very fast, as compared with that of such a case that the plurality of electronic appliances are connected to each other by using the communication cable so as to perform the communication operation via the communication interfaces. As a consequence, the outputs in accordance with the battery characteristic can be supplied in the high speed, and the voltage characteristic can be simulated in a precise manner.

Also, the voltage/current generating unit and the voltage/current measuring unit, which are employed so as to acquire the characteristic data of the battery, are commonly used even when the battery characteristic is simulated. As a result, the redundant structural portions are omitted, so that the entire battery characteristic simulating apparatus can be made compact, and further, the installation area thereof can be made small.

DETAILED DESCRIPTION OF THE PREFERRED EMBODIMENTS

The present invention generally relates to a battery characteristic simulating apparatus for supplying electric power which simulates a battery characteristic of a battery to a battery-driven type electronic appliance. More specifically, the present invention is directed to a battery characteristic simulating apparatus for outputting electric power in accordance with a battery characteristic in a high speed.

Embodiment modes of the present invention will now be described with reference to drawings.

Figure 1:
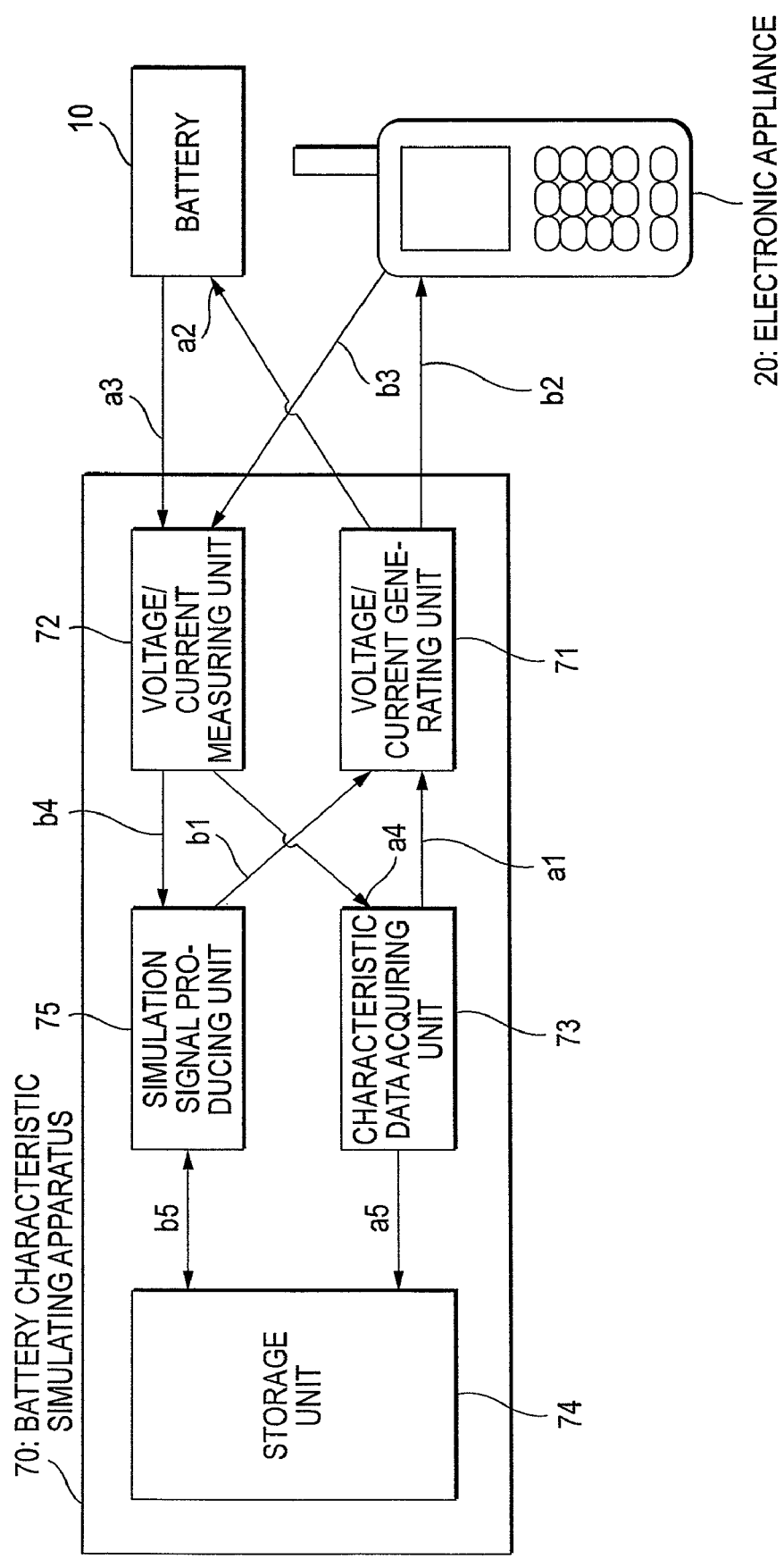
FIG. 1 is a structural diagram for indicating a battery characteristic simulating apparatus according to an embodiment of the present invention.

FIG. 1 is a structural diagram for showing a battery characteristic simulating apparatus 70 according to an embodiment of the present invention. It should be understood that the same reference numerals shown in FIG. 5 will be employed as those for denoting the same structural elements of this drawing, and descriptions thereof are omitted. In FIG. 1, a battery characteristic simulating apparatus 70 is provided instead of the electronic appliances 30, 40, 50, and 60. In FIG. 1, symbols "a1" to "a5", and "b1" to "b5" represent flows of signals.

The battery characteristic simulating apparatus 70 is equipped with a voltage/current generating unit 71, a voltage/current measuring unit 72, a characteristic data acquiring unit 73, a characteristic data table storage unit 74, and a simulation signal producing unit 75. The battery characteristic simulating apparatus 70 acquires a battery characteristic of a battery 10, outputs such a signal which simulates the acquired battery characteristic to an electronic appliance 20, and supplies electric power to the electronic appliance 20.

The voltage/current generating unit 71 outputs a predetermined generated value to the battery 10 and the electronic appliance 20. The voltage/current measuring unit 72 performs measuring operations as to the battery 10 and the electronic appliance 20. The characteristic data acquiring unit 73 causes the voltage/current generating unit 71 to output a predetermined generated value, and then, acquires such a measured value corresponding to this generated value from the voltage/current measuring unit 72. Also, the characteristic data acquiring unit 73 stores a characteristic data table in the characteristic data table storage unit 74, while the characteristic data table is constituted by a plurality of characteristic data. The simulation signal producing unit 75 causes the voltage/current generating unit 71 to output a predetermined generated value, and acquires a measured value corresponding to this generated value from the voltage/current measuring unit 72. Also, the simulation signal producing unit 75 calculates a new generated value from the measured value with reference to the characteristic data table of the characteristic data table storage unit 74.

In the battery characteristic simulating apparatus 70, the voltage/current generating unit 71, the voltage/current measuring unit 72, the characteristic data acquiring unit 73, the storage unit 74, and also, the simulation signal producing unit 75 are provided within the same housing as a single electronic appliance, Also, the voltage/current generating unit 71, the voltage/current measuring unit 72, the characteristic data acquiring unit 73, the storage unit 74, and also, the simulation signal producing unit 75 are connected to each other by employing an exclusively-used bus so as to transmit/receive data in a high speed.

Operations of such a battery characteristic simulating apparatus 70 will now be described. A first description is made of such an operation until a battery characteristic of the battery 10 is acquired.

The characteristic data acquiring unit 73 sets a generated value (either current value or voltage value) "a1" for acquiring characteristic data to the voltage/current generating unit 71. Then, the voltage/current generating unit 71 applies a predetermined generated value (namely, outputs either current or voltage) "a2" to the battery 10 in response to an instruction issued from the voltage/current generating unit 71. Furthermore, the voltage/current measuring unit 72 measures an output "a3" of the battery 10 at this time.

For example, the voltage/current generating unit 71 conducts a predetermined current from the battery 10, and at this time, a voltage outputted from the battery 10 is measured by the voltage/current measuring unit 72. Otherwise, the voltage/current generating unit 71 causes the battery 10 to output a predetermined voltage, and then, at this time, a current outputted from the battery 10 is measured by the voltage/current measuring unit 72. Then, the characteristic data acquiring unit 73 acquires characteristic data of voltage/current which are constituted by a pair of the generated value "a1" of the voltage/current generating unit 71, and the measured value "a4" of the voltage/current measuring unit 72.

Moreover, the characteristic data acquiring unit 73 slightly changes the generated value "a1" within a predetermined range, and then, causes the voltage/current generating unit 71 to output the generated value "a2" and causes the voltage/current measuring unit 72 to perform a measurement "a3" so as to measure a plurality of characteristic data within the predetermined range. Then, when the acquisitions for necessary numbers of characteristic data are accomplished, the characteristic data acquiring unit 73 collects these characteristic data and converts the format of the collected characteristic data into a predetermined format thereof, and then, stores the collected characteristic data having the predetermined format in the characteristic data table storage unit 74 as a characteristic data table "a5". As a result, the characteristic data table "a5" corresponding to the battery characteristic of the battery 10 under predetermined condition is formed in the storage unit 74.

Next, a description is made of such an operation that an output which simulates a battery characteristic corresponding to the voltage/current characteristic of the battery 10 is supplied to the electronic appliance 20. Firstly, the simulation signal producing unit 75 sets a predetermined generated value (namely, either current value or voltage value) "b1" to the voltage/current generating unit 71. Then, the voltage/current generating unit 71 applies a predetermined generated value "b2" (either current or voltage) to the electronic appliance 20 in accordance with an instruction from the voltage/current generating unit 75. Furthermore, the voltage/current measuring unit 72 performs a measuring operation "b3" of the electronic appliance 20 under application of the predetermined generated value "b2", and then, outputs measured value "b4" to the voltage/current producing unit 75. In other words, when the predetermined generated value "b2" is a voltage, the voltage/current measuring unit 72 performs a measuring operation of a current which is being supplied to the electronic appliance 20 by the voltage/current generating unit 71, whereas when the predetermined generated value "b2" is a current, the voltage/current measuring unit 72 performs a measuring operation of a voltage which is being applied to the electronic appliance 20 by the voltage/current generating unit 71. Then, the voltage/current measuring unit 72 outputs either the current or the voltage to the voltage/current generating unit 71 as the measured value "b4".

Thereafter, the voltage/current generating unit 75 reads out the characteristic data table "b5" of the storage unit 74 so as to obtain a generated value which is fitted to the characteristic data table "b5". That is to say, referring to the characteristic data table "b5", the voltage/current generating unit 75 acquires such a value corresponding to the measured value "b4" from the characteristic data table "b5" based upon such a combination data for combining the generated voltages "b1" supplied to the voltage/current generating unit 71 with the measured value "b4" derived from the voltage/current measuring unit 72. In this case, when the corresponding characteristic data is not present in the characteristic data table "b5", the voltage/current generating unit 75 interpolates such characteristic data in the vicinity of the measured value "b4" in order to obtain the corresponding value. Then, while the interpolated value is employed as a new generated value "b1", the simulation signal producing unit 75 sets this new generated value "b1" to the voltage/current generating unit 71. In accordance with the set of this new generated value "b1", the voltage/current generating unit 71 outputs a new generated value "b2" to the electronic appliance 20, and the voltage/current measuring unit 72 performs a measuring operation "b3" of the electronic appliance 20 under the application of this new generated value "b2", and then, outputs a measured value "b4" to the simulation signal producing unit 75. Since the above-explained operations are repeatedly carried out, the battery characteristic of the battery 10 is reproduced.

Figure 2A:
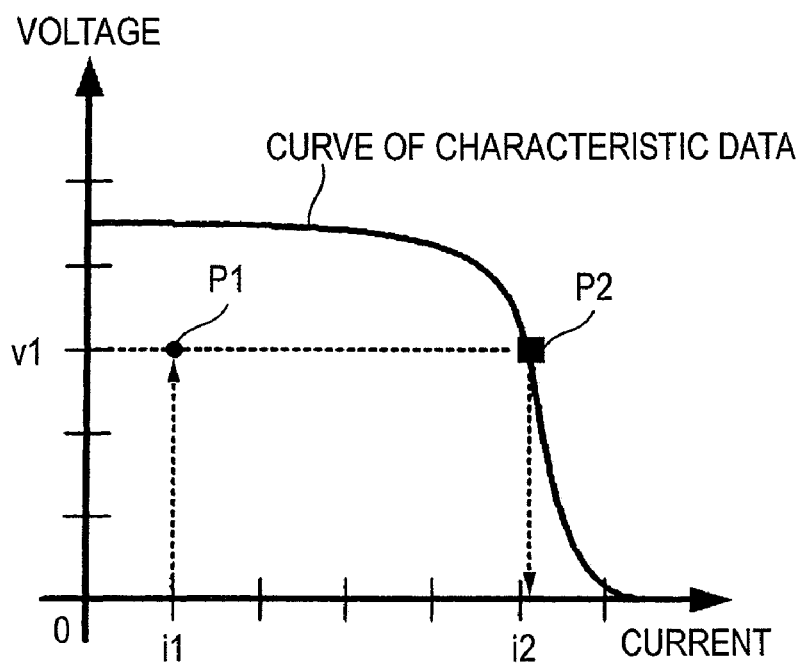
FIGS. 2A and 2B are diagrams for indicating an example of a characteristic data table.
Figure 2B:
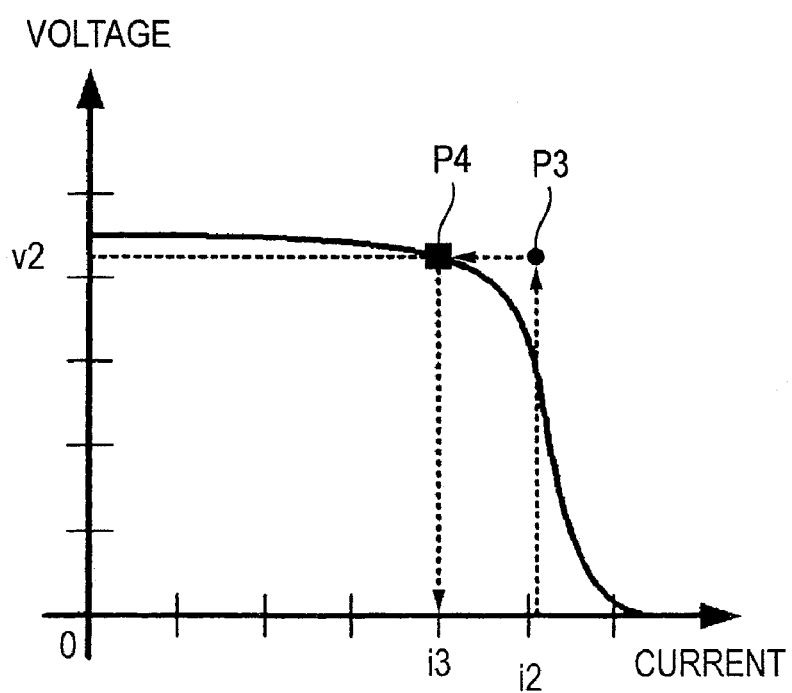

In this case, a concrete operation will now be described with reference to FIGS. 2A and 2B. This concrete description is made in such a case that a current value is employed as the generated value, and a voltage value is employed as the measured value. FIGS. 2A and 2B represent a characteristic data table of the battery 10, in which an abscissa shows a current and an ordinate indicates a voltage. It should also be understood that even when outputs of voltages become any voltage values, the voltage/current generating unit 71 is operated in such a manner that this voltage/current generating unit 71 outputs current values designated by the simulation signal producing unit 75.

The simulation signal producing unit 75 causes the voltage/current generating unit 71 to output such a current value "i1" of an initial value. Under the above-described current value "i1", the voltage/current measuring unit 72 measures a voltage "v1" which is applied from the voltage/current generating unit 71 to the electronic appliance 20.

Then, the simulating signal producing unit 75 compares a point "P1" of a combination between the generated value "i1" and the measured value "v1" with the characteristic data table (namely, curve of characteristic data shown in FIG. 2A). Since this point "P1" is not coincident with the characteristic data curve, the simulation signal producing unit 75 acquires another point "P2" on this curve, which corresponds to the voltage "v1", and acquires a current value "i2" of this point "P2". Furthermore, the simulation signal producing unit 75 causes the voltage/current generating unit 71 to output the current value "i2" acquired from the curve as a new generated value (namely, current value) (refer to FIG. 2A).

Then, the voltage/current measuring unit 72 measures such a voltage "v2" which is applied from the voltage/current generating unit 71 to the electronic appliance 20 under the supply of this current value "i2". In addition the simulating signal producing unit 75 compares a point "P3" of a combination between the generated value "i2" and the measured value "v2" with the curve of characteristic data shown in FIG. 2B. Since this point "P3" is not coincident with the characteristic data curve, the simulation signal producing unit 75 acquires another point "P4" on this curve, which corresponds to the voltage "v2", and acquires a current value "i3" of this point "P4". Furthermore, the simulation signal producing unit 75 causes the voltage/current generating unit 71 to output the current value "i3" acquired from the curve as a new generated value (after to FIG. 2B).

The above-described operation is repeatedly carried out so as to approximate the outputs of the voltage/current generating unit 71 to the characteristic data table, so that the battery characteristic of the battery 10 is reproduced.

Figure 5:
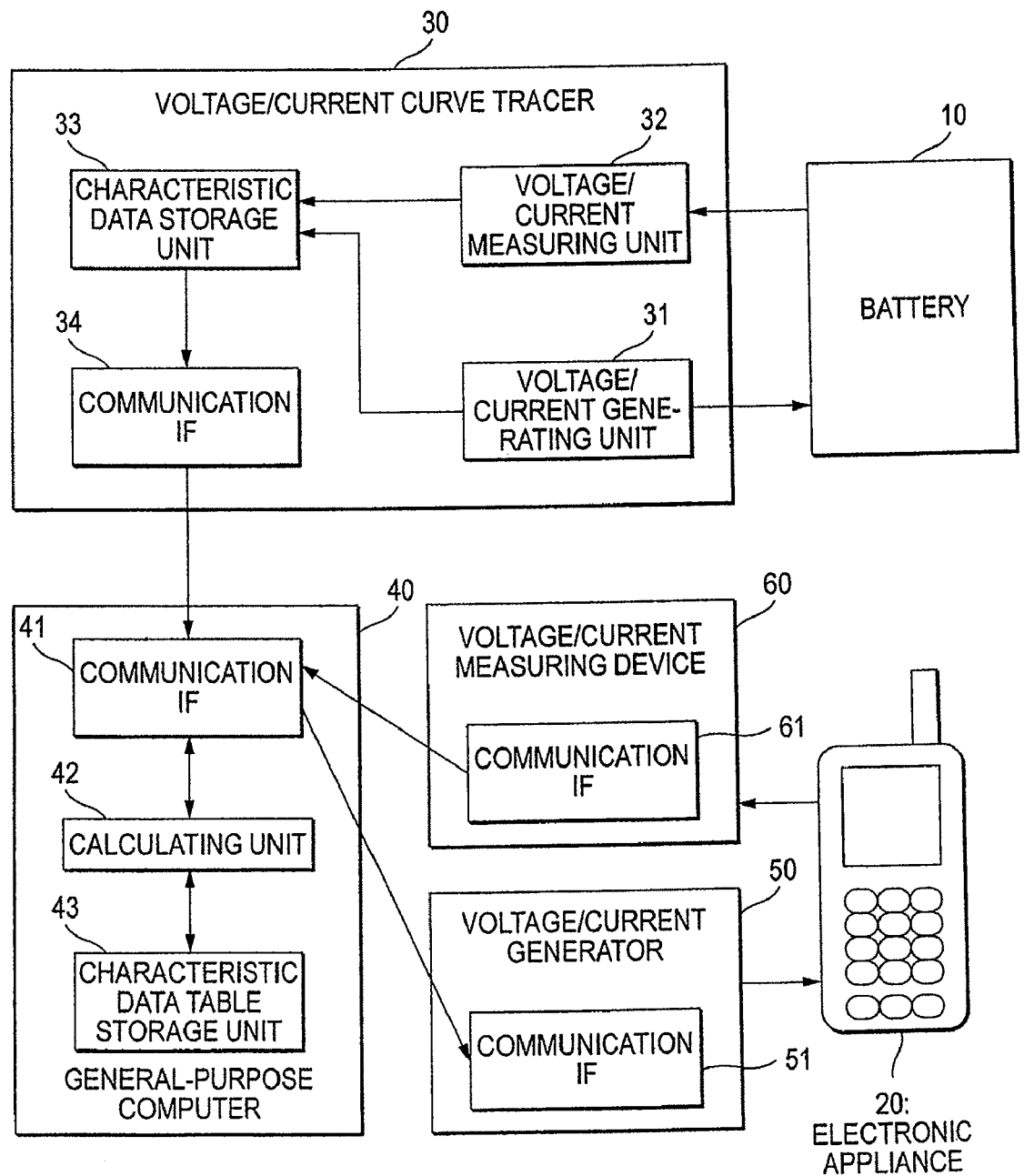
FIG. 5 is a diagram for showing the arrangements of the conventional battery characteristic simulating apparatus, the battery, and the electronic appliance.

As previously described, while the voltage/current generating unit 71, the voltage/current measuring unit 72, the characteristic data acquiring unit 73, the storage unit 74, and also, the simulation signal producing unit 75 are provided within the same housing of the simulating apparatus 70, these structural units are connected to each other via the exclusively-used bus so as to perform the battery characteristic simulating operation of the battery 10. As a result, as compared with such a case that the data communication is carried out via the communication interfaces 41, 51, 61 as represented in FIG. 5, the simulating operation speed of the battery characteristic simulating apparatus 70 becomes a very high speed. Accordingly, the outputs in accordance with the battery characteristic can be supplied in the high speed. As one example, such a time which is required for executing the following operations is approximately 0.7 ms, namely, the electronic appliance 20 is measured (b3); the new generated value "b1" is calculated; and the output is supplied based upon the new generated value "b2". This operation speed of approximately 0.7 ms could be improved about 10 times higher than the conventional operation speed of several milliseconds.

In other words, in such a case that the battery 10 is employed as the drive source of the electronic appliance 20, a characteristic change in the battery 10 occurs in the order of several milliseconds. In the conventional battery characteristic simulating apparatus shown in FIG. 5, since the operation time of several milliseconds is required in the simulation of 1 point to 1 point, it is practically difficult to simulate the characteristic change in a precise manner. To the contrary, in the battery characteristic simulating apparatus 70 indicated in FIG. 1, the simulating operation of 1 point to 1 point can be carried out, so that the battery characteristic can be reproduced in a fine mode. As a consequence, the test of the electronic appliance 20 can also be carried out in a correct manner.

Also, as compared with the battery characteristic simulating apparatus (curve tracer 30) shown in FIG. 5, the voltage/current generating unit 71 which outputs the generated values to the battery 10 and the electronic appliance 20 is commonly employed, and also, the voltage/current measuring unit 72 for measuring the battery 10 and the electronic appliance 20 is commonly employed. As a result, the redundant unit can be omitted, so that the entire portion of the battery characteristic simulating apparatus 70 can be made compact, and the installation area can be made small. Moreover, the plural sets of the above-described electronic appliances 30, 40, 50, 60 are no longer required, so that the cost can be suppressed.

Also, the voltage/current generating unit 71 and the voltage/current measuring unit 72 are commonly used when the characteristic data is acquired and also when the simulating operation is carried out, so that the maintenance of the battery characteristic simulating apparatus 70 can be easily performed, as compared with that of FIG. 5. This reason is given as follows: In other words, in the battery characteristic simulating apparatus shown in FIG. 5, the electronic appliances different from each other are utilized when the characteristic data is acquired and when the simulating operation is carried out. As a result, the calibration/adjustment between the voltage/current measuring unit 32 and the voltage/current measuring device 60 must be carried out, and further, the calibration/adjustment between the voltage/current generating unit 31 and the voltage/current generator 50 must be carried out.

Also, the voltage/current generating unit 71, the voltage/current measuring unit 72, the characteristic data acquiring unit 73, the storage unit 74, and also, the simulation signal producing unit 75 are provided within the same housing of the battery characteristic simulating apparatus 70, and these structural units are connected to each other via the exclusively-used bus. As a result, while such a communication cable connected among the electronic appliances 30, 40, 50, 60 as indicated in FIG. 5 is no longer required, cumbersome operations for connecting these electronic appliances can be omitted.

Then, since the voltage/current generating unit 71, the voltage/current measuring unit 72, the characteristic data acquiring unit 73, the storage unit 74, and also, the simulation signal producing unit 75 are provided within the same housing of the battery characteristic simulating apparatus 70, this battery characteristic simulating apparatus 70 no longer requires such an operation that the respective electronic appliances 30, 40, 50, and 60 shown in FIG. 5 are separately operated.

It should also be understood that the present invention is not limited only to the above-descried embodiment, but may be applied to the below-mentioned example. That is, in FIGS. 2A and 2B, the battery characteristic simulating apparatus 70 is arranged in such a manner that the generated value is the current value and the measured value is the voltage value. Alternatively, the generated value may be set as a voltage value, and the measured value may be set as the current value.

Figure 3:
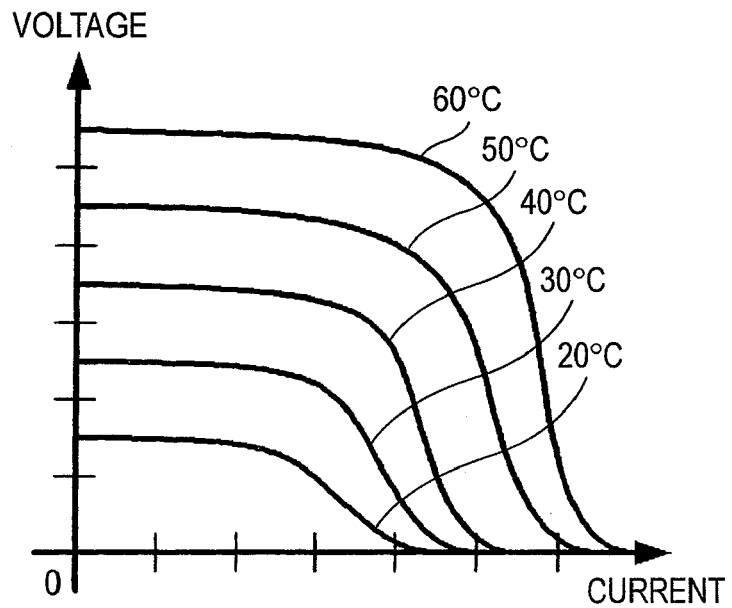
FIG. 3 is a diagram for showing another example of the characteristic data table.

The characteristic data acquiring unit 73 may alternatively measure battery characteristics of the battery 10 under a plurality of different conditions. For instance, as shown in FIG. 3, while battery characteristics may be measured at various temperatures, the battery characteristics with respect to the respective temperatures may be stored in the storage unit 74.

Figure 4:
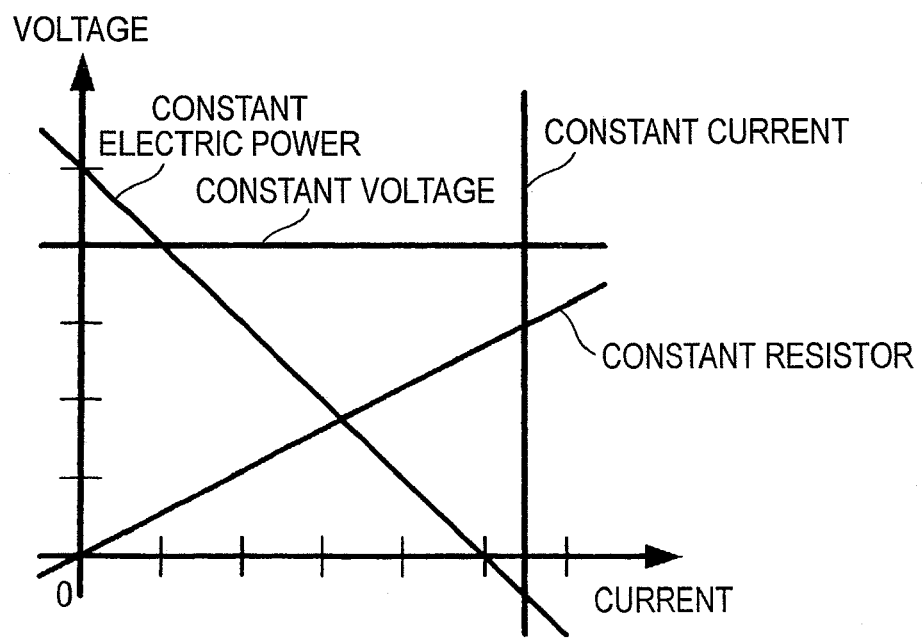
FIG. 4 is a diagram for showing another example of the characteristic data table.

In the above-described arrangement, the simulation signal producing unit 75 causes the voltage/current generating unit 71 to output the generated value in accordance with the battery characteristic. Alternatively, not only the battery characteristic, but also such signals which simulate various sorts of characteristics such as a constant voltage, a constant current, constant electric power, and a constant resistance (refer to FIG. 4) may be set to the voltage/current generating unit 71.

What is claimed is:

1. A battery characteristic simulating apparatus for supplying electric power which simulates a battery characteristic of a battery to a battery-driven type electronic appliance, the apparatus comprising:
a voltage/current generating unit for outputting a predetermined generated value to both the battery and the electronic appliance;
a voltage/current measuring unit for measuring a value of either the battery or the electronic appliance when the voltage/current generating unit outputs the predetermined generated value;
a characteristic data acquiring unit for acquiring a battery characteristic of the battery based upon characteristic data made by combining the predetermined generated value outputted from the voltage/current generating unit to the battery with a measured value of the battery measured by the voltage/current measuring unit;
a storage unit for storing the battery characteristic of the characteristic data acquiring unit;
a simulation signal producing unit for calculating a generated value for the electronic appliance based upon the battery characteristic stored in the storage unit and the measured value of the electronic appliance measured by the voltage/current measuring unit, and for outputting the calculated generated value to the voltage/current generating unit; and
a housing, wherein
the voltage/current generating unit, the voltage/current measuring unit, the characteristic data acquiring unit, the storage unit, and the simulation signal producing unit are provided within the same housing.

2. The battery characteristic simulating apparatus as in claim 1, wherein the battery is a rechargeable battery.

3. The battery characteristic simulating apparatus as in claim 1, wherein the battery characteristic is a voltage/current characteristic which is outputted by the battery.

4. The battery characteristic simulating apparatus as in claim 1, wherein
the battery characteristic is acquired for each of a plurality of temperatures, and the storage unit stores the battery characteristic with respect to each of the plurality of temperatures.

5. The battery characteristic simulating apparatus as in claim 1, wherein
the voltage/current generating unit, the voltage/current measuring unit, the characteristic data acquiring unit, the storage unit, and the simulation signal producing unit are connected to each other via exclusively-used buses.

6. A battery characteristic simulating apparatus for supplying electric power which simulates a battery characteristic of a battery to a battery-driven type electronic appliance, the apparatus comprising:
a voltage/current generating unit that is electrically coupled to a battery and an electronic appliance, the voltage/current generating unit for outputting a generated value to both the battery and the electronic appliance;
a voltage/current measuring unit that is electrically coupled to the battery and to the electronic appliance, the voltage/current measuring unit for measuring a value of either the battery or the electronic appliance when the voltage/current generating unit outputs the generated value;
a characteristic data acquiring unit that is electrically coupled to the voltage/current generating unit and the voltage/current measuring unit, the characteristic data acquiring unit for acquiring a battery characteristic of the battery based upon characteristic data generated based on the generated value outputted from the voltage/current generating unit to the battery and the measured value of the battery measured by the voltage/current measuring unit;
a storage unit that is electrically coupled to the characteristic data acquiring unit, the storage unit for storing the battery characteristic generated by the characteristic data acquiring unit; and
a simulation signal producing unit that is electrically coupled to the voltage/current generating unit, the voltage/current measuring unit, and the storage unit, the simulation signal producing unit for calculating a calculated value for the electronic appliance based upon the battery characteristic stored in the storage unit and the measured value of the electronic appliance measured by the voltage/current measuring unit, and for outputting the calculated value to the voltage/current generating unit.

7. The battery characteristic simulating apparatus according to claim 6, further comprising a housing, wherein the voltage/current generating unit, the voltage/current measuring unit, the characteristic data acquiring unit, the storage unit, and the simulation signal producing unit are provided within the same housing.

8. The battery characteristic simulating apparatus according to claim 6, wherein the voltage/current generating unit is directly electrically coupled to both the battery and the electronic appliance, and the voltage/current measuring unit is directly electrically coupled to both the battery and the electronic appliance.

* * * * *